(12) United States Patent
Wulbrandt

(10) Patent No.: US 9,382,742 B2
(45) Date of Patent: Jul. 5, 2016

(54) CONTROL VALVE

(75) Inventor: Tim Wulbrandt, Schwelm (DE)

(73) Assignee: Dorma Deutschland GmbH, Ennepetal (DE)

( * ) Notice: Subject to any disclaimer, the term of this patent is extended or adjusted under 35 U.S.C. 154(b) by 1546 days.

(21) Appl. No.: 12/531,656

(22) PCT Filed: Mar. 12, 2008

(86) PCT No.: PCT/EP2008/001964
§ 371 (c)(1),
(2), (4) Date: Sep. 16, 2009

(87) PCT Pub. No.: WO2008/113498
PCT Pub. Date: Sep. 25, 2008

(65) Prior Publication Data
US 2010/0024303 A1    Feb. 4, 2010

(30) Foreign Application Priority Data

Mar. 16, 2007 (DE) .......................... 10 2007 013 377

(51) Int. Cl.
*F16K 47/00* (2006.01)
*F16L 55/02* (2006.01)
(Continued)

(52) U.S. Cl.
CPC . *E05F 3/12* (2013.01); *F16B 39/34* (2013.01); *F16K 1/04* (2013.01); *E05Y 2201/20* (2013.01); *E05Y 2201/254* (2013.01); *E05Y 2201/458* (2013.01); *E05Y 2800/292* (2013.01);
(Continued)

(58) Field of Classification Search
CPC ...... F16B 39/282; F16B 39/284; F16B 39/34; Y10S 411/947; Y10T 16/56; F16K 1/04
USPC ......... 251/264, 324, 215, 216, 122, 123, 367, 251/903; 16/71, 49, 50; 411/257, 258, 304
See application file for complete search history.

(56) References Cited

U.S. PATENT DOCUMENTS 1,359,144 A    11/1920  Angell
1,886,159 A *  11/1932  Brown ........................ 251/155
(Continued)

FOREIGN PATENT DOCUMENTS

DE    199 01 234 C1    3/2000
DE    102 28 872 A1    1/2004
(Continued)

OTHER PUBLICATIONS

International Search Report issued in the prior PCT international application No. PCT/EP2008/001964.

*Primary Examiner* — Kevin Murphy
*Assistant Examiner* — Hailey K Do
(74) *Attorney, Agent, or Firm* — Cozen O'Connor

(57) ABSTRACT

The invention relates to a regulating valve, which is attachable, in particular in a bore of a hydraulic door closer, executed with a female thread. The regulating valve has a body, adjoined by a regulating area, and a thread provided with an anti-rotation means. The thread with the anti-rotation element can be screwed into the female thread of the bore of the hydraulic door closer. In order to provide a regulating valve with a simple design while excluding unwanted adjustment of the regulating valve during the operation, the anti-rotation means includes a raised area, which can cooperate with the bore or the female thread of the door closer.

20 Claims, 5 Drawing Sheets

(51) Int. Cl.
*F16B 39/34* (2006.01)
*E05F 3/12* (2006.01)
*F16K 1/04* (2006.01)

(52) U.S. Cl.
CPC ...... *E05Y2800/298* (2013.01); *E05Y 2900/132* (2013.01); *Y10T 137/87169* (2015.04)

(56) References Cited

U.S. PATENT DOCUMENTS

| | | | | |
|---|---|---|---|---|
| 2,414,577 | A | * | 1/1947 | Adair et al. .................. 137/434 |
| 2,672,173 | A | * | 3/1954 | Chantler ....................... 411/302 |
| 2,677,149 | A | * | 5/1954 | Fineran .......................... 249/96 |
| 2,720,845 | A | * | 10/1955 | Whitlock, Jr. ................ 251/304 |
| 3,166,292 | A | * | 1/1965 | Forman .......................... 251/215 |
| 3,474,845 | A | * | 10/1969 | Podell ............................ 411/302 |
| 3,664,305 | A | * | 5/1972 | Hart et al. ........................ 119/72 |
| 3,785,378 | A | * | 1/1974 | Stewart .......................... 604/248 |
| 4,148,111 | A | * | 4/1979 | Lieberman ........................ 16/59 |
| 5,502,874 | A | | 4/1996 | Lucas |
| 6,412,224 | B1 | * | 7/2002 | Feucht et al. ................... 49/340 |
| 7,025,329 | B2 | * | 4/2006 | Winter .......................... 251/218 |

FOREIGN PATENT DOCUMENTS

| | | | |
|---|---|---|---|
| DE | 103 61 085 A1 | 7/2004 | |
| EP | 0 919 688 A2 | 6/1999 | |
| JP | 06159521 A * | 6/1994 | ............. F16K 1/02 |
| WO | WO 2006/018186 A1 | 2/2006 | |

* cited by examiner

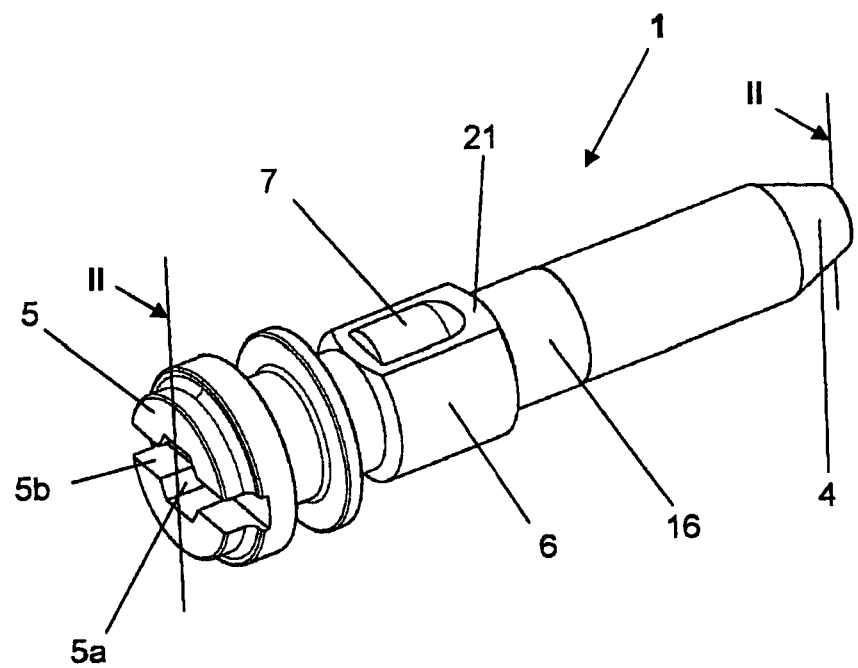
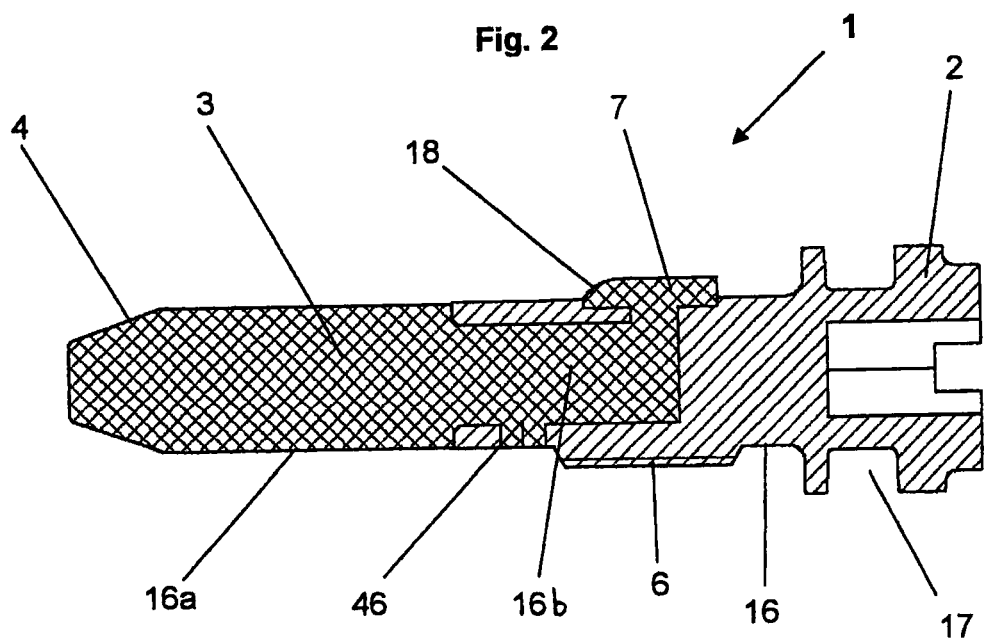

CONTROL VALVE

CROSS REFERENCE TO RELATED APPLICATIONS

This is a U.S. national stage of International Application No. PCT/EP2008/001964, filed on Mar. 12, 2008, claiming priority to German Application No. 10 2007 013 377.6, filed on Mar. 16, 2007, the entire contents of both applications being expressly incorporated herein by reference.

BACKGROUND OF THE INVENTION

1. Field of the Invention

The invention relates to a regulating valve, which is attachable in particular in a bore of a hydraulic door closer, executed with a female thread, which valve has a body, adjoined by a regulating area, and a thread provided with an anti-rotation means, the thread, including the anti-rotation means, being screwed into the female thread of the bore.

2. Description of the Related Art

DE 102 28 872 B4 discloses a regulating valve for a door closer, which consists of a body and a regulating area. For regulating the regulating valve, the body has a thread that is screwable into a bore of the door closer. In this case, the regulating area is executed in a bush-shape and connected to the body via a ball-joint connection. In order to avoid an unwanted rotation of the regulating valve, in particular of the regulating area, an anti-rotation means is provided, which is formed as an extension or as a projection and disposed at the regulating area. This extension is longitudinally conducted in a groove within the housing of the door closer.

SUMMARY OF THE INVENTION

It is an object of the present invention to provide a regulating valve attachable in a bore of a hydraulic door closer, which has a simple design, and precludes any unwanted adjustment of the regulating valve during operation.

According to the invention, the regulation valve has a body formed with a pocket hole bore along a longitudinal axis of the body and opposite a head area of the body. A regulating area is provided and includes an extension that is positively and torsion-resistantly attached in the pocket bore hole. The regulating area also includes a raised area having a circumferential collar, which corresponds to lateral surfaces of the groove formed on the body. It is thereby possible to manufacture the regulating area in one piece, non-positively and positively as well as aligned with regard to the body. The regulating area is connected to the body in a stabilized way as the raised area bears against the lateral surfaces and thus counteracts a notch effect, after the regulating valve is screwed into the door closer or when the mechanic adjusts the regulating valve within the door closer.

According to the invention, it is provided that the anti-rotation means is present in a raised area, which cooperates with the bore or the female thread of the door closer. Thereby a clamping effect is achieved, which avoids an unintentional releasing or rotation of the regulating valve.

Another improvement is achieved in that the body has a groove at which the raised area is disposed. Thereby the raised area can be supported in the groove to avoid rotation and is stabilized when being screwed into the bore, such as to avoid shearing off.

It is of particular advantage that the groove be disposed in the region of a surface. Thereby it is achieved that the raised area, which is deformed once screwed-in, is not apportioned about the circumference of the shank or the thread, which, in an unfavourable case, could cause a reduced clamping effect.

Furthermore, it is an advantage that the body has a shank, at which the raised area is disposed and projects beyond the diameter of the shank. Thus a clamping effect can be achieved at the circumferential surface of the bore of the door closer.

The raised area being disposed at the thread and projecting beyond the diameter of the thread is of considerable advantage. Thus a clamping effect is transferred to several thread flanks of the female thread of the door closer, which equals higher clamping forces. Thereby an increased surface pressure is achieved at the engaging thread parts.

It has proven to be practical to dispose the thread at the shank. Thereby the production of the thread can be realized in a simple manner.

Another improvement is provided in that the regulating area consists of a shank prolongation with an end, wherein the shank prolongation is connected to the raised area via an extension. Thus the regulating area can be produced in a single operation.

Another substantial advantage is that the body has a pocket hole bore, which is disposed along the longitudinal axis of the body, opposite the head area. Thereby the regulating area can be produced as one piece and non-positively and positively connected, as well as aligned to the body.

It is furthermore advantageous that the pocket hole bore has an angular or non-circular cross-section. This provides an additional protection against rotation when screwing the regulating valve into the bore of the door closer.

It is again advantageous that the extension is positively and rotation-resistantly fastened in the pocket hole bore. The regulating area is thus connected to the body in a stabilized way.

Furthermore, it has proven to be advantageous that the extension has a neck which projects into a bore of the body. Thereby the extension is additionally secured against rotation.

It is a substantial advantage that the raised area has a circumferential collar corresponding to lateral surfaces of the groove. Therewith the raised area bears against the lateral surfaces and counteracts a notch effect when being screwed into the door closer, respectively when the mechanic adjusts the regulating valve within the door closer.

It is an advantage that the raised area is disposed positively and/or non-positively and/or positively through material at the thread. This allows for a very fine adjustment of the clamping effect of the material used at the raised area, because it engages directly into the corresponding thread of the door closer and is guided in the thread flanks through the material flow of the raised area. The material flow of the raised area is achieved in that screw pitches are formed at the raised area, when screwing the regulating valve into the bore of the door closer and thus into the corresponding thread at that location. This generates a high surface pressure, in particular between the thread flanks of the female thread and of the regulating valve. It has been shown that, due to such a disposition, the engaging thread parts no longer rotate on their own. Furthermore, a manual and/or intentional adjusting of the regulating valve is obviously still possible. In other words, at any time the regulating valve can be adjusted corresponding to the specific requirements of a defined closing behaviour, the anti-rotation means effectively avoiding automatic rotation, in particular the one caused by occurring dynamic stresses.

The regulating area has an end facing away from the body and being tapered, preferably cone-shaped. This embodiment offers a more precise adjustment of the oil flow, which considerably influences the closing speed of the closing operation. Despite the forces, which are originated by the fluid flow, acting upon the regulating valve, the raised area ensures that the regulating valve does not readjust accidentally and independently.

It has proven to be advantageous that the raised area is attached at the body through injection molding. Thereby the regulating area is produced in a simple mode of operation. Depending on the requirements with regard to the material to be processed, the injection molding procedure can be modified. The body may be made from metal, for example zinc, brass or steel, the regulating area being preferably made from plastic material. In particular in order to achieve a high strength, the plastic material may be fiber-glass reinforced, in particular, the plastic material may have a certain percentage of fiber glass and/or carbon fiber and/or aramid fibers.

Another possibility is that the body and/or the regulating area consist of plastic material, in particular the body consisting of a fiber reinforced plastic material. Thereby the overall regulating valve can be manufactured in a single operation.

Another advantage turns out to be a colored execution of the body. Thereby, different types of regulating valves can be visually distinguished.

It is advantageous that the door closer has a supply channel, a drainage channel and a cone-shaped valve seat, a fluid being able to be conducted through the supply channel along the valve seat and to the drainage channel. The free end of the regulating area is substantially adapted to the valve seat of the door closer. As a rule, there is a certain distance between the valve seat and the preferably cone-shaped end of the regulating area, such that the fluid of the supply channel can flow between the valve seat and the preferably cone-shaped end of the regulating area into the direction of the drainage channel.

Another advantage is that the raised area has a radius, which, while screwing the regulating valve into the female thread of the bore of the door closer, offers a minor initial screwing torque. The developing screw pitches at the raised area can thus be formed in a simple and easy way. Furthermore, no important notch effects are generated at the raised area.

FIGS. 6 and 7, as well as parts of the FIGS. 8 and 9 show the regulating area of the inventive regulating valve, respectively the way the regulating area looks like after the injection process and how it is directly connected to the body. In order to be able to clearly describe the regulating area in detail, these illustrations (FIGS. 6 and 7) have been chosen, in which the regulating area is illustrated as an individual part. In this shape, the regulating area of the inventive regulating valve will not be present as an individual part; but it will be directly connected to the body after the injection molding.

BRIEF DESCRIPTION OF THE DRAWINGS

In the drawings:

FIG. 1 shows an inventive regulating valve in a perspective view,

FIG. 2 shows the inventive regulating valve of FIG. 1 in a full section along the sectional plane II-II, FIG. 10 is a partial sectional view of a door closer, the regulating valve being screwed-in.

DETAILED DESCRIPTION OF EMBODIMENTS

Figure 3:
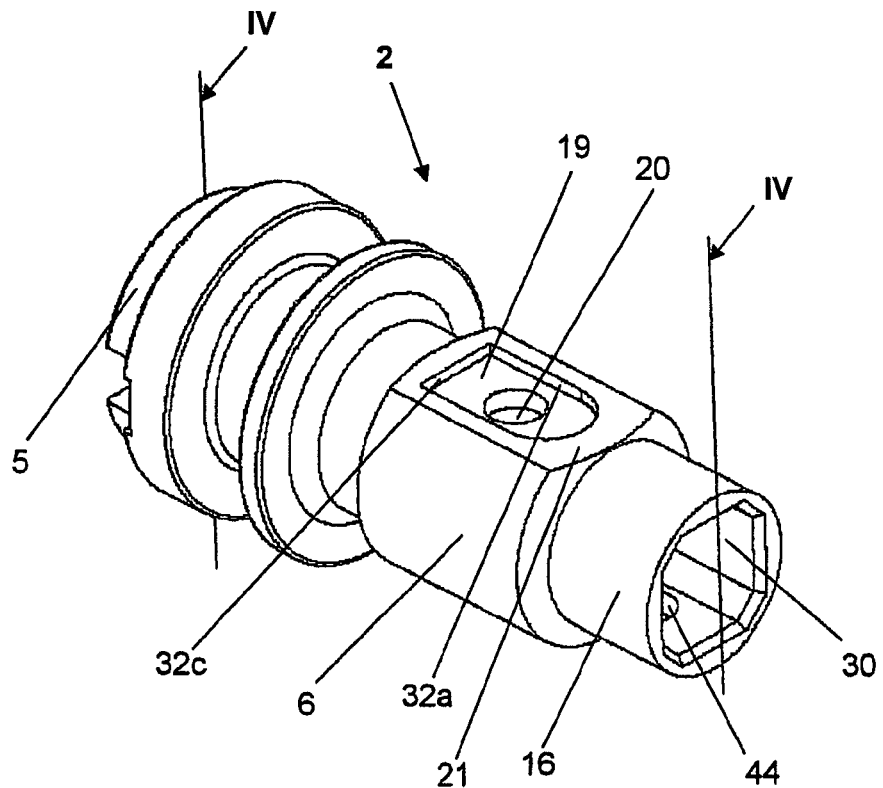
FIG. 3 shows a body of the inventive regulating of FIG. 1 valve in a perspective view.

FIG. 1 shows a regulating valve 1, which is provided for a hydraulic door closer. In this case, various door closers can be considered, which for example can be operated by an eccentric cam disc according to DE 103 61 085 A1 or by a toothed rack according to DE 199 01 234 C1. The regulating valve 1 has a head area 5, at which a hexagon 5*a* as well as a slot 5*b* are formed. The shank 16 of the regulating valve 1 has a thread 6, at which a surface 21 is located. There is a raised area 7 in partial areas of the surface 21. One end 4 of the regulating valve 1 is formed in a tapering cone-shape.

FIG. 2 shows a full section of the regulating valve 1 along the sectional plane II-II of FIG. 1. The regulating valve 1 consists of a body 2, as well as of a regulating area 3. Substantially, the regulating area 3 consists of a shank prolongation 16*a* and a free end 4. The raised area 7 is presented with a radius 18, which ensures that, when screwing the regulating valve 1 into the bore of the door closer, a smooth initial cut takes place at the raised area 7. The body 2 has a reception 17 for a sealing element. This sealing element may consist for example of an O-ring. Furthermore, the body 2 has a thread 6 at the shank 16. A neck 46 is arranged at the opposite side of the raised area 7.

FIG. 3 shows the body 2 having a shank 16 at which a thread 6 is arranged. This thread 6 has a surface 21 extending along the overall length of the thread 6. A groove 19, which also may extend along the total length of the thread, is recessed into the surface 21.

The lateral surfaces 32*a* and 32*c* are produced through the recess of the groove 19. At the side of the body 2 opposite the head area 5, the body 2 has a pocket hole bore 30, which cooperates positively with the shank prolongation 16*a*. The pocket hole bore 30 may have, for example a rectangular, square or triangular cross-section. The bottom of the groove 19 has a material exit opening 20, extending all the way into the positive pocket hole bore 30. Furthermore, on the opposite side of the surface 21, a bore 44, which extends all the way into the pocket hole bore 30, is arranged at the shank 16 as an additional anti-rotation means.

Figure 4:
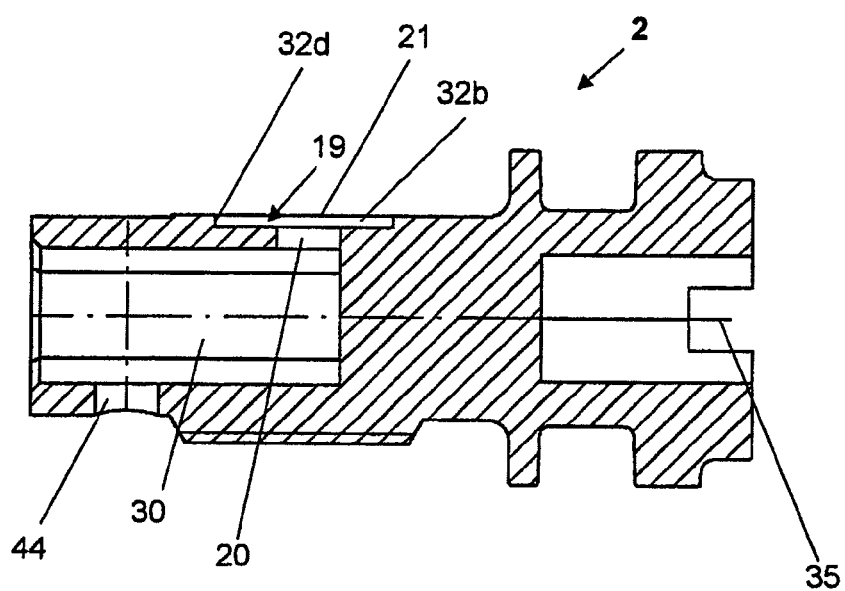
FIG. 4 shows the body of the inventive regulating valve of FIG. 3 in a full section along the sectional plane IV-IV.

FIG. 4 shows the body 2 in a full section. In this case, it is shown that the surface 21 as well as the groove 19 are preferably disposed parallel to the axis of rotation 35. The lateral walls 32*b* and 32*d* are produced through the recess of the groove 19. Furthermore, there are the pocket hole bore 30, as well as the adjoining material exit opening 20 and the bore 44 for the anti-rotation means.

Figure 5:
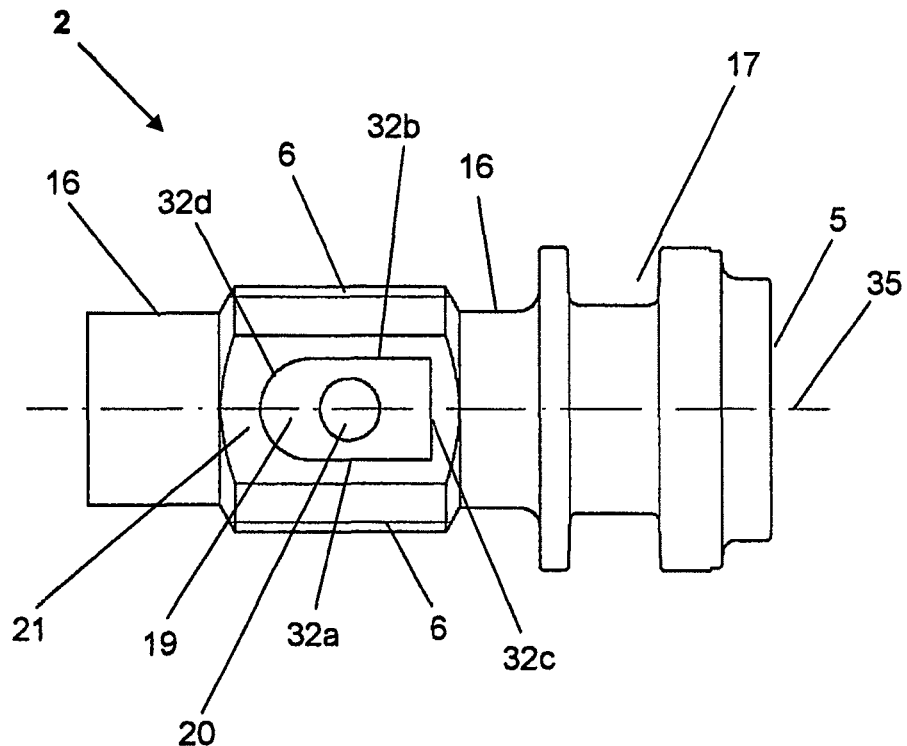
FIG. 5 shows the body of the inventive regulating valve of FIG. 3 in a top view.
Figure 10:
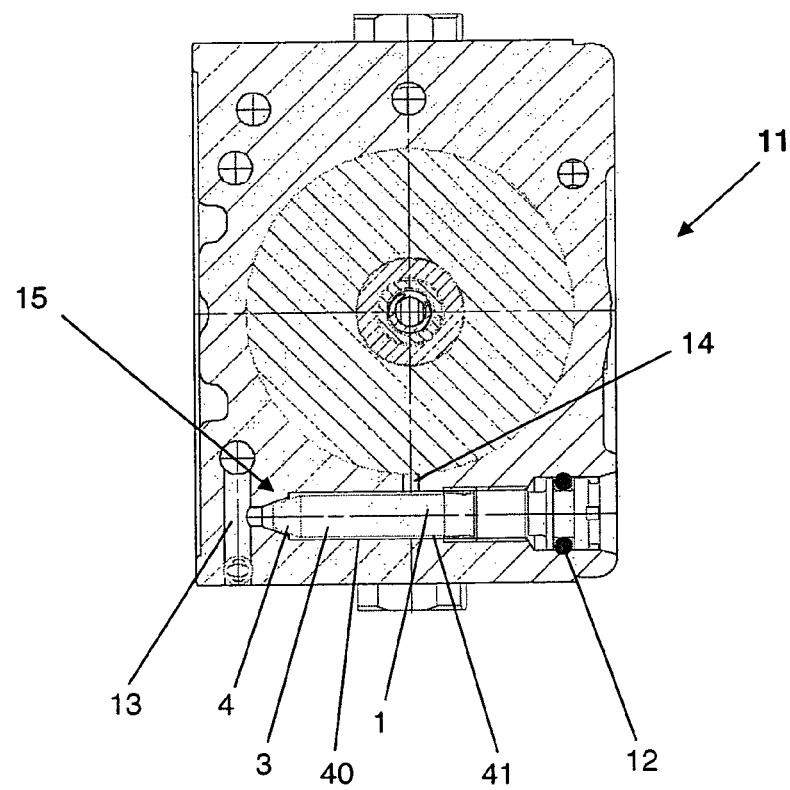

FIG. 5 shows the body 2 wherein the thread 6 is provided at its shank 16. The groove 19 is located in the partial area of the surface 21, whereby the locating surfaces 32*a*, 32*b*, 32*c* and 32*d* are produced. Furthermore, there is the material exit opening 20 in the region of the groove 19. The surface 21 is formed centrally with regard to the axis of rotation 35. A reception 17 for a sealing element is located between the head area 5 and the thread 6. During the injection molding, the plastic material reaches the groove 19 through the material exit opening 20 and its raised form is controlled. The lateral areas 32*a* and 32*b* of the groove 19 serve as an additional stabilization of the raised area 7 to prevent rotation when the mechanic screws the regulating valve 1 into the bore of the door closer 11, for example, during adjustment of the closing behavior of the door closer 11 (FIG. 10).

Figure 6:
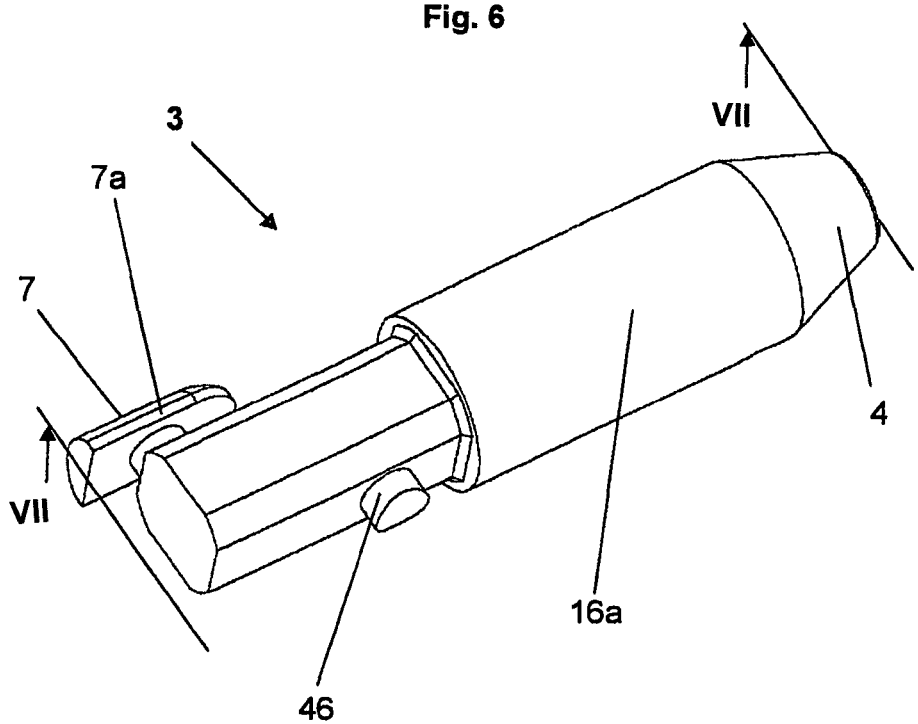
FIG. 6 shows the regulating area of the inventive regulating valve of FIG. 1 in a perspective view.

FIG. 6 shows the regulating area 3 in a perspective view. The raised area 7 has a collar 7a which is disposed circumferentially at the raised area 7. This circumferential collar 7a corresponds to the lateral surfaces 32a, 32b, 32c and 32d of the groove 19 and thus represents an additional protection against rotation. The neck 46 is arranged on the opposite side of the raised area 7. The end 4 of the regulating area 3 is disposed at the shank prolongation 16a in a tapering cone shape.

Figure 7:
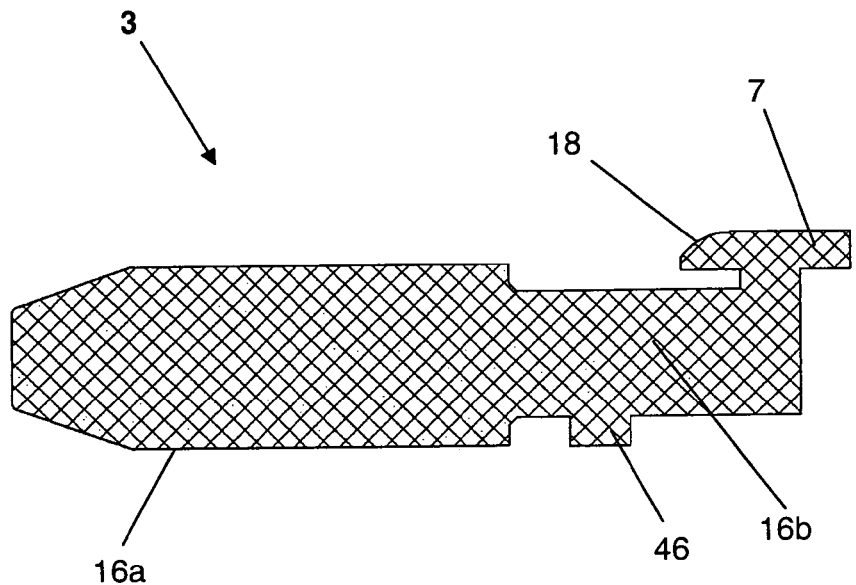
FIG. 7 shows the regulating area of the inventive regulating valve of FIG. 6 in a full section along the sectional plane VII-VII.

FIG. 7 shows the regulating area 3 in a full section in which the radius 18 as well as the raised area 7 are visible. The neck 46, the shank 16a and the extension 16b are arranged at the regulating area 3.

Figure 8:
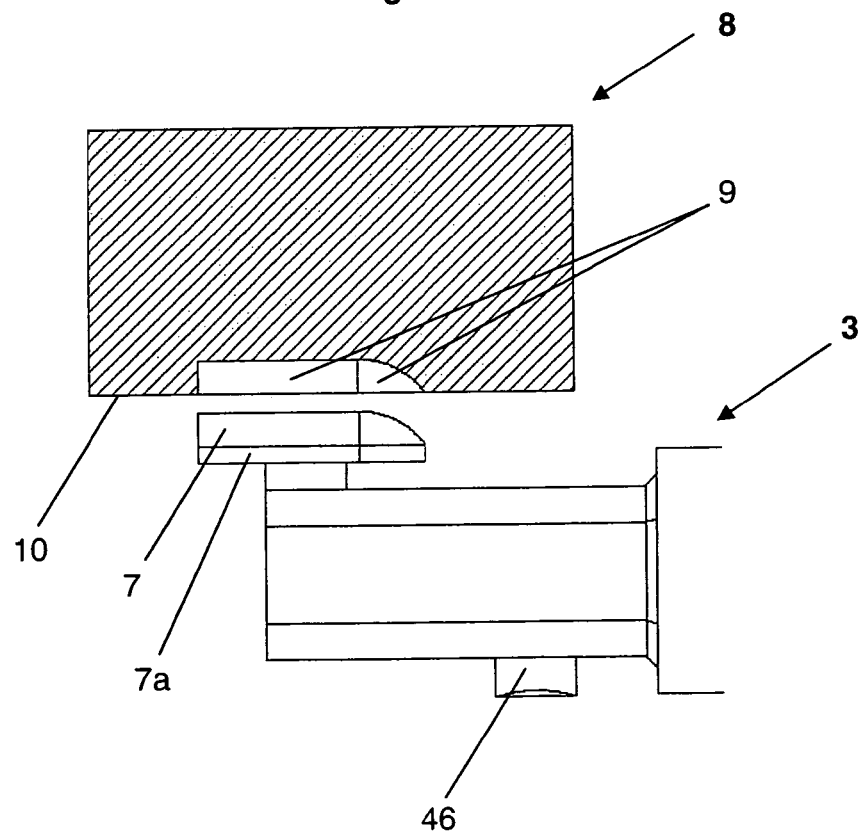
FIG. 8 is a detailed view of a slider in a full section.

FIG. 8 shows the shaping of the raised area 7 during the production process. In this case, a slider 8, which is a part of an operating means, is employed during the injection molding. The slider 8 has a female mold 9, which is filled with material during the injection molding. The female mold 9 is limited at the supporting surface 10. The raised area 7 is thus shaped. FIG. 8 also shows a portion of the regulating area 3 with the raised area 7 and the neck 46, in order to clearly show that the raised area 7 is formed during the injection molding with the assistance of the slider 8 and of the female mold 9 indicated at that location. The collar 7a is formed through the groove 19 of the body 2. For example polyacetal (POM) may be used as a material for the raised area 7.

Figure 9:
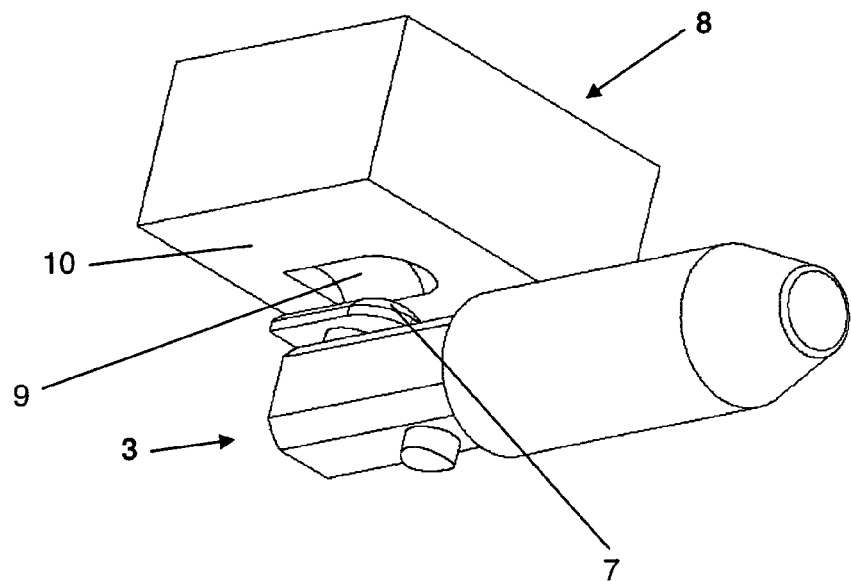
FIG. 9 is a detailed view of the slider of FIG. 8 in a perspective illustration.

FIG. 9 shows a section of the slider 8, which forms the shape of the raised area 7 at the regulating area 3 through the female mold 9 at the slider. The female mold 9 ends at the supporting surface 10 and is limited at that location. The slider 8 is a part of the operation means, used to perform the injection molding. The slider 8 rests with its supporting surface 10 on the surface 21 of the body 2 (FIG. 3) and thus serves as a seal during the injection molding such that no plastic material is able to flow out of the mold in an uncontrolled manner.

FIG. 10 shows a door closer 11 into which the regulating valve 1 is screwed. The regulating valve 1 has a sealing element 12. The end 4 of the regulating area 3 and thus of the regulating valve 1 is located in a cone-shaped valve seat 15 of the door closer 11. A supply channel 13, through which oil is supplied, is located in the region of the cone-shaped end 4 of the regulating area 3. Generally the cone-shaped end 4 of the regulating area 3 does not directly bear against the valve seat 15, such that the oil can flow through the small channel, formed between the valve seat 15 and the cone-shaped free end 4 of the regulating area 3, in the direction of a drainage channel 14. The flow cross-section for the oil can be adjusted at the regulating valve 1, whereby in particular the closing behavior of the door closer 11 is controllable. On account of the above described anti-rotation means, the forces produced by the flowing oil and acting upon the regulating valve 1, are unable to cause an unwanted rotation of the regulating valve 1, not even in the tolerance range.

The above described regulating valve 1 is produced as follows. The body 2 is manufactured in advance in the shape according to FIG. 3 and has, at its shank 16, preferably at the thread, a surface 21 into which a groove 19 is machined, which preferably has a material exit opening 20. The body 2 is inserted into operating means, preferably a molding tool. For clarity's sake, the illustration of the operating means has been omitted. Among other means, the operating means include at least one slider 8, which represents the shape of the raised area 7. The slider 8 sits with its surface 10 on the surface 21 of the inserted body 2 and thus seals the surface 21 to the exterior. In the interior, a hollow space is created through the groove 19, the female mold 9, the material exit opening 20, the bore for the anti-rotation means 44, as well as through the positive pocket hole bore 30. While the operating means are brought into the processing position, another area of the hollow space is created which forms the shank 16 of the regulating area 3 and the free end 4 of the regulating area 3. Thus the complete hollow space of the operating means in conjunction with the body 2 corresponds to the form illustrated in FIGS. 6 and 7.

During the injection molding, a plastic material, which in the present exemplary embodiment is a polyacetal (POM), distinguished among others things by its excellent sliding characteristics, good resistance to chemicals, and high abrasion resistance, is injected into the above described hollow space. Thereby the form illustrated in FIGS. 6 and 7 is created. This form, such as illustrated in FIGS. 6 and 7, is non-positively and/or positively connected to the body 2. Subsequently to the injection molding, the operating means is opened, the slider 8 is removed from the surface 21 of the body 2, such that the regulating valve 1 according to FIG. 1 is provided in the present operating means and is ready to be removed therefrom.

When screwing the regulating valve 1 into the bore 40 of the door closer 11, the radius 18 at the raised area 7 assists in an easy initial screwing and a subsequent screwing into the female thread of the door closer 11. Furthermore, an additional clamping effect is achieved through the inventive anti-rotation means, because the axial clearance between the thread 6 of the regulating valve 1 and the female thread 41 of the door closer 11 is filled by the raised area 7. Thereby a high surface pressure is achieved at the thread portions engaging each other, in particular at the thread flanks free from the anti-rotation means. At the same time, the regulating valve 1 can be manually adjusted and/or unscrewed from the bore at any time.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A regulating valve for a door closer comprising:
   a body;
   a pocket hole bore disposed along a longitudinal axis of the body opposite a head area;
   an extension torsion-resistantly attached in the pocket hole bore;
   a regulating area, constructed as a single piece, adjoining the body having a shank prolongation with an end;
   a circumferential collar connected to the shank prolongation via the extension;
   a thread arranged on the body, the thread having a planar surface; and
   anti-rotation means provided for the thread that comprise a raised area of the circumferential collar, wherein the circumferential collar corresponds to lateral surfaces of a groove that is disposed as a recess formed in the planar surface.

2. The regulating valve according to claim 1, wherein the body presents the groove at which the raised area is disposed.

3. The regulating valve according to claim 1, wherein the body comprises a shank, the raised area projects beyond a diameter of the shank.

4. The regulating valve according to claim 1, wherein the raised area is disposed at the thread and projects beyond a diameter of the thread.

5. The regulating valve according to claim 3, wherein the thread is disposed at the shank.

6. The regulating valve according to claim 1, wherein the pocket hole bore has one of an angular cross-section and a non-circular cross-section.

7. The regulating valve according to claim 1, wherein the extension has a neck that projects into a further bore of the body.

8. The regulating valve according to claim 5, wherein the raised area is disposed at the thread.

9. The regulating valve according to claim 7, wherein the regulating area has an end that faces away from the body and is formed as a taper.

10. The regulating valve according to claim 1, wherein the regulating area is attached to the body by injection molding.

11. The regulating valve according to claim 1, wherein at least one of the body and the regulating area comprise a plastic material.

12. The regulating valve according to claim 1, wherein the body is color coded.

13. A door closer comprising:
   a supply channel;
   a drainage channel;
   a bore having a cone-shaped valve seat; and
   a regulating valve received in the bore, the regulating valve comprising:
      a body;
      a pocket hole bore disposed along a longitudinal axis of the body opposite a head area;
      an extension torsion-resistantly attached in the pocket hole bore;
      a regulating area, constructed as a single piece, adjoining the body having a shank prolongation with an end;
      a circumferential collar connected to the shank prolongation via the extension;
      a thread arranged on the body, the thread having a planar surface; and
      anti-rotation means provided for the thread that comprise a raised area of the circumferential collar,
      wherein the circumferential collar corresponds to lateral surfaces of a groove that is disposed as a recess formed in an area of the planar surface, and
   wherein a fluid can be conducted through the supply channel along the valve seat to the drainage channel.

14. The regulating valve according to claim 13, wherein the raised area presents a radius which, when the regulating valve is screwed into a thread of the bore of the door closer, whereby an easy initial screwing torque for the mechanic is provided.

15. The regulating valve according to claim 9, wherein the end that faces away from the body is cone-shaped.

16. The regulating valve according to claim 11, wherein the plastic material is a fiber reinforced plastic material.

17. The regulating valve according to claim 1, wherein the planar surface is parallel to a longitudinal axis of the regulating valve.

18. The regulating valve according to claim 13, wherein the planar surface is parallel to a longitudinal axis of the regulating valve.

19. The regulating valve according to claim 1, wherein the circumferential collar connected to the shank prolongation via the extension is constructed as a single piece.

20. The regulating valve according to claim 13, wherein the circumferential collar connected to the shank prolongation via the extension is constructed as a single piece.

* * * * *